United States Patent [19]
Bost et al.

[11] 4,140,856
[45] Feb. 20, 1979

[54] COLOR STABILIZATION OF INTUMESCENT FLAME RETARDANT

[75] Inventors: Howard W. Bost; Ernest A. Zuech, both of Bartlesville, Okla.

[73] Assignee: Phillips Petroleum Company, Bartlesville, Okla.

[21] Appl. No.: 880,244

[22] Filed: Feb. 22, 1978

[51] Int. Cl.$^2$ .......................................... C07D 251/70
[52] U.S. Cl. ............................. 544/195; 260/45.8 NT
[58] Field of Search ................. 544/195; 260/45.8 NT

[56] References Cited

U.S. PATENT DOCUMENTS

| | | | |
|---|---|---|---|
| 2,642,408 | 6/1953 | Stanin et al. | 260/32.6 |
| 3,255,151 | 6/1966 | Hecker et al. | 260/45.9 |
| 3,281,381 | 10/1966 | Hechenbleikner et al. | 260/23 |
| 3,322,718 | 5/1967 | Jacob | 260/45.8 |
| 3,551,422 | 12/1970 | Tesoro et al. | 544/195 |
| 3,658,753 | 4/1973 | Reed et al. | 260/45.7 |
| 3,755,323 | 8/1973 | Weil et al. | 544/195 |
| 3,787,407 | 1/1974 | Hendricks | 544/195 |
| 3,922,249 | 11/1975 | Mills | 260/45.8 |
| 4,010,137 | 3/1977 | Brady | 260/45.8 NT |

FOREIGN PATENT DOCUMENTS 2554778  6/1976  Fed. Rep. of Germany ........... 544/195

*Primary Examiner*—John M. Ford

[57] ABSTRACT

Undesirable color formation during the preparation of a cured intumescent flame retardant is minimized by including a color stabilizing amount of at least one color stabilizing phosphorus-containing compound.

20 Claims, No Drawings

COLOR STABILIZATION OF INTUMESCENT FLAME RETARDANT

This invention relates to flame retardants. More particularly, this invention relates to a non-halogenated flame retardant suitable for incorporation into thermoplastics.

Fire safety rules have increasingly affected the market for flammable plastics. Many plastics can be made flame retardant by incorporating therein a halogenated organic material which decomposes, on heating, in such a fashion as to reduce the flammability of the plastic. However, consumer alarm over the possible release of toxic gases during combustion of such flame retarded plastics has spurred development of other non-halogenated flame retardant additives and flame retardant systems.

Intumescent flame retardants have been developed as alternatives for the halogenated flame retardants. However, incorporation of an intumescent flame retardant within a thermoplastic is generally precluded due to void formation during processing caused by triggering of the gas generating "intumescent reaction" between the components of the flame retardant at processing temperature. Consequently, such intumescent flame retardants must be used as coatings rather than incorporated into the plastic. However, such coatings can be lost if melting of the plastic during combustion carries the coating away from the surface to be protected.

An intumescent flame retardant has been developed which can be incorporated in a thermoplastic prior to molding. This flame retardant is disclosed in U.S. Pat. No. 4,010,137, which issued Mar. 1, 1977, on application Ser. No. 641,042, filed Dec. 15, 1975 by Donnie G. Brady. The disclosure of U.S. Pat. No. 4,010,137 is incorporated herein by reference. Such intumescent flame retardant is the product which results when (1) at least one phosphorus oxide compound of the formula $(P_2O_5)_{0.5-1.0}(H_2O)_{0.01-1.5}$, (2) melamine, and (3) at least one saturated open chain polyol containing from 5 to 15 carbon atoms and from 4 to 8 hydroxyl groups are combined and heated under such conditions that the product will not cause significant foaming of the thermoplastic when a thermoplastic containing it is subsequently subjected to molding conditions.

It has been discovered that even when steps are taken to substantially exclude oxygen during the preparation of that flame retardant composition the composition obtained tends to have a color ranging from off-white to tan to dark brown rather than white. It is desirable for many applications for the intumescent flame retardant to be essentially white since it is blended with polymers at levels which could impart an undesirable color to the final thermoplastic composition if the flame retardant were not essentially white.

Accordingly, it is an object of this invention to provide a method for minimizing dark color formation in the preparation of a cured phosphorus-containing intumescent flame retardant.

It is another object of this invention to provide a cured intumescent flame retardant composition of improved color.

Other aspects, objects, and advantages of the present invention will be apparent to those skilled in the art having the benefit of the present disclosure.

In accordance with the present invention undesirable color formation during the preparation of the phosphorus-containing flame retardant is inhibited by including among the reactants employed a color stabilizing amount of at least one color stabilizing phosphorus-containing compound selected from the group consisting of phosphorous acid, $H_2(HPO_3)$; hypophosphorous acid, $H(H_2PO_2)$; and compounds of the general formula $(RO)_3P$ wherein each R is individually selected from the group consisting of hydrogen and hydrocarbyl radicals having 1 to 20 carbon atoms. Examples of such hydrocarbyl (R) radicals include alkyl, cycloalkyl, aryl, alkaryl, aralkyl, and alkylcycloalkyl.

It is preferred that said phosphorus-containing compounds have boiling points sufficiently high that there is no significant distillation of the compounds out of the reaction mixture during the preparation of the flame retardant. If the phosphorus-containing compound employed is a phosphite ester, it is preferable that it be charged to the reaction mixture in the absence of any added water, as water tends to cause the hydrolysis of the phosphite ester with a resulting loss in some of the beneficial effect of the phosphite ester. Since some water is believed to form as a by-product during the preparation of the intumescent flame retardant, those phosphite esters which are most resistant to hydrolysis are preferred.

Examples of suitable phosphorus-containing compounds which can be utilized according to the instant invention include hypophosphorous acid, phosphorous acid, trimethyl phosphite, tributyl phosphite, triethyl phosphite, triphenyl phosphite, triisopropyl phosphite, benzyldiethyl phosphite, dibenzyl phosphite, dibutyl phosphite, diethyl phosphite, diisopropyl phosphite, dilauryl phosphite, dimethyl phosphite, diphenyl phosphite, and di-n-octadecyl phosphite.

In accordance with this invention the low valent phosphorus-containing compound is employed in a color stabilizing amount, viz. an amount which will result in a final flame retardant which is lighter in color than if the phosphorus-containing compound had not been employed. Generally, the amount of low valent phosphorus-containing compound employed will be in the range of about 0.1 to about 10 weight percent of the total reactants employed in producing the flame retardant, preferably about 0.2 to about 4 weight percent. (It is to be noted that in the preceding sentence and throughout this disclosure and the claims the low-valent phosphorus-containing compound is intended to be included in the total reactants used for defining the basis of the weight percent values specified.)

It has been found that even small amounts of color stabilizing phosphorus-containing compound will give substantial improvements in the color of the final product when the heating of the flame retardant reactants is carried out in a substantially oxygen free atmosphere. As the amount of oxygen in the atmosphere in which that heating is conducted is increased, then additional amounts of color stabilizing phosphorus compound are necessary to provide any improvements. Thus, in order to obtain lightly colored intumescent flame retardants, it is preferred that the heating be conducted in a substantially oxygen free atmosphere. The exclusion of oxygen can be accomplished by maintaining an inert atmosphere, such as nitrogen, helium, argon, methane, n-butane, and the like, or by maintaining a reduced pressure, while the reactants are heated.

The point at which said at least one color stabilizing phosphorus-containing compound is combined with the other flame retardant reactants is not considered to be critical. However, the later that said color stabilizing phosphorus-containing compound is added during the heating of the reactants, generally the less color improvement there will be. Accordingly, it is preferred that at the outset of the heating said color stabilizing phosphorus-containing compound be combined with the reactants that are heated.

The present invention and its advantages are further illustrated by the following examples.

EXAMPLE I

A 2 liter, 4 necked, resin flask equipped with stirring and heating means and a means for passing a stream of nitrogen through the vapor space was charged with the phosphorus pentoxide (141 g). Phosphoric acid (46.5 g of 85% $H_3PO_4$) was then added slowly to the reactor while stirring. A mixture of pentaerythritol (81.6 g) and 15 grams of melamine was then slowly added to the reactor while heating and stirring. This addition required about one hour, after which the reaction mixture was allowed to cool overnight under a stream of nitrogen. The following morning, heat and stirring were again resumed and after about one hour the remainder of the melamine (136.5 g) was added over about a twenty minute period. The reaction mixture was heated and stirred for an additional period of about 2.6 hours, during which time considerable foaming of the mixture occurred. In order to reduce the troublesome foaming, the reaction heat was removed and the mixture allowed to cool under a nitrogen atmosphere. The mixture was then removed from the flask and pulverized in a Waring blender. The reactor was cleaned and another stirrer having two blades spaced four inches apart was installed. The pulverized reaction mixture was replaced in the resin flask and heating and stirring were resumed under a stream of nitrogen for about 2.5 hours. The heat was then removed and the mixture allowed to cool under nitrogen atmosphere. The reaction product was then removed and pulverized again in a Waring blender to provide 365 grams of dark tan product. The result of this run indicates that even though a nitrogen stream was flowing through the vapor space of the reaction zone during heating of the reaction mixture this did not prevent the production of a product having a dark tan color. Said dark tan color is believed to result from the presence of small amounts of oxygen adventitiously added with the reactants and/or the reaction mixture following replacement of the stirrer.

EXAMPLE II

In another run the phosphorus-containing flame retardant was prepared using the same reactants and amounts as in Example I. In this run however 7.8 grams of triphenyl phosphite was also employed.

The phosphorus pentoxide and phosphoric acid (46.5 g of 85% $H_3PO_4$) were charged to a reaction vessel equipped with heating and stirring means which vessel had been flushed out with a stream of nitrogen. A mixture of the pentaerythritol, about 15 grams of the melamine, and the triphenylphosphite were added slowly to the reactor with heating and stirring. This addition required about 45 minutes. After stirring and heating for about one hour and 45 minutes, the remainder of the melamine was added to the reaction vessel over a period of about 45 minutes. An additional 2.25 hours of heating and stirring was utilized following the conclusion of the melamine addition. The reactor was shut down and the product allowed to cool under a nitrogen atmosphere. About 407 grams of cooled white product was removed from the reactor. This example illustrates that the triphenyl phosphite addition inhibits undesirable darkening of the intumescent flame retardant.

EXAMPLE III

In another run carried out according to the instant invention, the color stabilizing phosphorus-containing compound additive was hypophosphorous acid utilized as a 50% by weight aqueous solution. The recipe employed in the instant run is shown below.

| | Recipe | wt., g | (moles) |
|---|---|---|---|
| Charge No. 1 | $P_2O_5$ | 142.0 | (0.97) |
| | $H_3PO_4$ (a) | 38.9 | (0.395) |
| Charge No. 2 | Pentaerythritol | 81.6 | (0.6) |
| | Melamine | 15.0 | (0.12) |
| | $H_3PO_2$ (b) | 2.5 | (0.04) |
| Charge No. 3 | Melamine | 136.5 | (1.08) |

(a) Charged as 85% $H_3PO_4$.
(b) Charged as 50% $H_3PO_2$.

The reactor utilized was the same as that used for the run described in Example II. The first charge to the reactor was the phosphorus pentoxide and 85% phosphoric acid. The second charge to the reactor included the pentaerythritol, a portion of the melamine (15 grams) and the hypophosphorous acid (5 grams of 50% solution). About 1.25 hours was utilized for the addition of charge no. 2 in the above recipe and about 45 minutes was required for the addition of charge no. 3. At the conclusion of the addition of the melamine in charge no. 3, the mixture was heated for about 3 hours then the heat turned off and the mixture allowed to cool. There was removed from the reactor 417 grams of intumescent flame retardant which was white in color. The result of the instant run demonstrates that hypophosphorous acid was effective in producing an intumescent flame retardant with white color rather than tan, brown or an off-white appearance.

Reasonable variations and modifications, which will be apparent to those skilled in the art, can be made in this invention without departing from the spirit and scope thereof.

What is claimed is:

1. A method for minimizing undesirable color formation during the preparation of a cured intumescent flame retardant prepared by combining and heating (a) at least one phosphorus oxide compound of the formula $(P_2O_5)_{0.5-1.0}(H_2O)_{0.0-1.5}$, (b) melamine, and (c) at least one saturated open chain polyol containing from 5 to 15 carbon atoms and from 4 to 8 hydroxyl groups, said method comprising, including among the reactants employed in preparing the intumescent flame retardant a color stabilizing amount of at least one color stabilizing phosphorus-containing compound selected from the group consisting of phosphorous acid, hypophosphorous acid, and compounds of the general formula $(RO)_3P$ wherein each R is individually selected from the group consisting of hydrogen and hydrocarbyl radicals having from 1 to 20 carbon atoms.

2. A method according to claim 1 wherein at least one compound of the general formula $(RO)_3P$ is employed.

3. A method according to claim 2 wherein each R is individually selected from the group consisting of hydrogen, alkyl, cycloalkyl, aryl, alkaryl, aralkyl, and alkylcycloalkyl radicals.

4. A method according to claim 3 wherein said color stabilizing phosphorus compound is employed in an amount in the range of about 0.1 to about 10 weight percent of the total reactants employed in producing the phosphorus-containing flame retardants.

5. A method according to claim 4 wherein said at least one compound of the general formula (RO)$_3$P is selected from the group consisting of trimethyl phosphite, tributyl phosphite, triethyl phosphite, triphenyl phosphite, triisopropyl phosphite, benzyldiethyl phosphite, dibenzyl phosphite, dibutyl phosphite, diethyl phosphite, diisopropyl phosphite, dilauryl phosphite, dimethyl phosphite, diphenyl phosphite, and di-n-octadecyl phosphite.

6. A method according to claim 1 wherein said color stabilizing phosphorus compound is employed in an amount in the range of about 0.1 to about 10 weight percent of the total reactants employed in producing the phosphorus-containing flame retardants.

7. A method according to claim 6 wherein the heating of the reactants is carried out under a substantially oxygen-free atmosphere.

8. A method according to claim 7 wherein hypophosphorous acid is employed.

9. A method according to claim 7 wherein phosphorous acid is employed.

10. A method according to claim 7 wherein triphenyl phosphite is employed.

11. An intumescent flame retardant which is prepared by combining and heating (a) at least one phosphorus oxide compound of the formula $(P_2O_5)_{0.5-1.0}(H_2O)_{0.0-1.5}$, (b) melamine, (c) at least one saturated open chain polyol containing from 5 to 15 carbon atoms and from 5 to 8 hydroxyl groups, and (d) a color stabilizing amount of at least one color stabilizing phosphorus-containing compound selected from the group consisting of phosphorous acid, hypophosphorous acid, and compounds of the general formula (RO)$_3$P wherein each R is individually selected from the group consisting of hydrogen and hydrocarbyl radicals having from 1 to 20 carbon atoms.

12. An intumescent flame retardant according to claim 1 wherein at least one compound of the general formula (RO)$_3$P is employed.

13. An intumescent flame retardant according to claim 12 wherein each R is individually selected from the group consisting of hydrogen, alkyl, cycloalkyl, aryl, alkaryl, aralkyl, and alkylcycloalkyl radicals.

14. An intumescent flame retardant according to claim 13 wherein said color stabilizing phosphorus compound is employed in an amount in the range of about 0.1 to about 10 weight percent of the total reactants employed in producing the phosphorus-containing flame retardants.

15. An intumescent flame retardant according to claim 14 wherein said at least one compound of the general formula (RO)$_3$P is selected from the group consisting of trimethyl phosphite, tributyl phosphite, triethyl phosphite, triphenyl phosphite, triisopropyl phosphite, benzyldiethyl phosphite, dibenzyl phosphite, dibutyl phosphite, diethyl phosphite, diisopropyl phosphite, dilauryl phosphite, dimethyl phosphite, diphenyl phosphite, and di-n-octadecyl phosphite.

16. An intumescent flame retardant according to claim 11 wherein said color stabilizing phosphorus compound is employed in an amount in the range of about 0.1 to about 10 weight percent of the total reactants employed in producing the phosphorus-containing flame retardants.

17. An intumescent flame retardant according to claim 16 wherein the heating of the reactants is carried out under a substantially oxygen-free atmosphere.

18. An intumescent flame retardant according to claim 17 wherein hypophosphorous acid is employed.

19. An intumescent flame retardant according to claim 17 wherein phosphorous acid is employed.

20. An intumescent flame retardant according to claim 17 wherein triphenyl phosphite is employed.

* * * * *